United States Patent
Luo et al.

(10) Patent No.: US 11,391,563 B2
(45) Date of Patent: Jul. 19, 2022

(54) ULTRA-SENSITIVE SPECKLE ANALYZING SYSTEM

(71) Applicant: Purdue Research Foundation, West Lafayette, IN (US)

(72) Inventors: Qiaoen Luo, West Lafayette, IN (US); Justin A. Patel, West Lafayette, IN (US); Kevin J. Webb, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/150,880

(22) Filed: Jan. 15, 2021

(65) Prior Publication Data

US 2021/0247180 A1 Aug. 12, 2021

Related U.S. Application Data

(60) Provisional application No. 62/970,743, filed on Feb. 6, 2020.

(51) Int. Cl.
*G01B 11/02* (2006.01)
*G01B 11/24* (2006.01)

(52) U.S. Cl.
CPC .............................. *G01B 11/2441* (2013.01)

(58) Field of Classification Search
CPC ............ G01B 11/2441; G01B 9/02094; G01B 9/02095; G01B 9/02096
See application file for complete search history.

(56) References Cited

U.S. PATENT DOCUMENTS

| | | | | |
|---|---|---|---|---|
| 4,967,093 A * | 10/1990 | Takemori | ............. | G01B 11/162 250/559.2 |
| 5,024,528 A | 6/1991 | Freund et al. | | |
| 7,161,582 B2 | 1/2007 | Bathiche et al. | | |
| 2004/0059526 A1* | 3/2004 | Toyooka | ............ | G01B 9/02084 702/57 |
| 2010/0177164 A1* | 7/2010 | Zalevsky | ............. | G01B 11/162 348/46 |
| 2012/0113252 A1* | 5/2012 | Yang | ........................ | G01C 3/08 348/135 |
| 2016/0238386 A1* | 8/2016 | Yang | ................... | G01B 11/2441 |
| 2018/0289297 A1* | 10/2018 | Zalevsky | ........... | G01B 9/02094 |
| 2019/0212187 A1* | 7/2019 | Leizerson | .......... | G01B 9/02094 |

OTHER PUBLICATIONS

Mewman et al., Phys. Rev. Lett. 116, 73902, 2016.
(Continued)

*Primary Examiner* — Tarifur R Chowdhury
*Assistant Examiner* — Jonathon Cook
(74) *Attorney, Agent, or Firm* — Piroozi-IP, LLC

(57) ABSTRACT

An ultra-sensitive speckle-analyzing system is disclosed which includes an image capture device configured to receive a scattered field having a speckle configuration and thereby capture i) a reference speckle image, and ii) a subsequent speckle image, each of the reference and the subsequent speckle images having a plurality of speckles on a background; and a processor configured to generate a cross-correlation between the plurality of speckles of the reference and the subsequent speckle images, to thereby represent a change in the speckle configuration.

18 Claims, 6 Drawing Sheets

(56) References Cited

OTHER PUBLICATIONS

Choi et al., Phys. Rev. B 83, 134207, 2011.
Rotter et al., Rev. Mod. Phys. 89, 015005, 2017.
Hsueh et al., J. Opt. Soc. Am. B 34, 2059, 2017.
Donoho, IEEE Trans. Inf. Theory 52, 1289, 2006.
Webb et al., Phys. Rev. Applied 6, 024020, 2016.
Bender et al., Phys. Rev. Lett. 125, 165901, 2020.
Popoff et al., Phys. Rev. Lett. 104, 100601, 2010.
Yu et al., Phys. Rev. Lett. 111, 153902, 2013.
Betzig et al., Science 313, 1642, 2006.
Hess et al., Biophys. J. 91, 4258, 2006.
Rust et al., Nat. Methods 3, 793, 2006.
Oppel et al., Phys. Rev. Lett. 109, 233603, 2012.
Classen et al., Optica 4, 580, 2017.
Schwartz et al., Phys. Rev. A 85, 033812, 2012.
Gatto Monticone et al., Phys. Rev. Lett. 113, 143602, 2014.
Antipa et al., Optica 5, 1, 2018.
Kuo et al., Opt. Express 28, 8384, 2020.
Webster et al., Phys. Rev. Lett. 88, 033901, 2002.
Beenakker, Rev. Mod. Phys. 69, 731, 1997.
Vellekoop et al., Phys. Rev. Lett. 101, 120601, 2008.
Shi et al., Phys. Rev. Lett. 108, 043901, 2012.
Popoff et al., Phys. Rev. Lett. 112, 133903, 2014.
Ambichl et al., Phys. Rev. X 7, 041053, 2017.
Reed, IRE Trans. Inform. Theory 8, 194, 1962.
Goetschy et al., Phys. Rev. Lett. 111, 063901, 2013.
Imry, Europhysics Lett. 1, 249, 1986.
Pichard et al., Europhysics Lett. 2,477, 1986.
Mello et al., Phys. Rev. B 40, 5276, 1989.
Buttiker et al., Phys. Rev. B 31, 6207, 1985.
Nieuwenhuizen et al., Phys. Rev. Lett. 74, 2674, 1995.
Wigner, Annals of Mathematics 62, 548, 1955.
Wigner, Annals of Mathematics 67, 325, 1958.
Mar'Cenko et al., Mathematics of the USSR-Sbornik 1, 457, 1967.
G'Erardin et al., Phys. Rev. Lett. 113, 173901, 2014.
Newman et al., Phys. Rev. Lett. 113, 263903, 2014.
Carminati et al., Phys. Rev. A 91, 023807, 2015.
Labeyrie, Astron. Astrophys. 6, 85, 1970.
Dorokhov, Soviet Journal of Experimental and Theoretical Physics Letters 36, 318, 1982.
Pendry et al., Proc. R. Soc. A 437, 67, 1992.

* cited by examiner

ULTRA-SENSITIVE SPECKLE ANALYZING SYSTEM

CROSS-REFERENCE TO RELATED APPLICATIONS

The present patent application is related to and claims the priority benefit of U.S. Provisional Patent Application Ser. No. 62/970,743 filed Feb. 6, 2020 the contents of which are hereby incorporated by reference in its entirety into the present disclosure.

STATEMENT REGARDING GOVERNMENT FUNDING

This invention was made with government support under ECCS1610068 and CCF1618908 awarded by the National Science Foundation. The government has certain rights in the invention.

TECHNICAL FIELD

The present disclosure generally relates to a system for and method of determining movement of a surface or an object or an incident field, and in particular, to an ultra-sensitive speckle analyzer or sensor adapted to detect and measure minute movements of an object following illumination by, e.g., a laser.

BACKGROUND

This section introduces aspects that may help facilitate a better understanding of the disclosure. Accordingly, these statements are to be read in this light and are not to be understood as admissions about what is or is not prior art.

In many circumstances, there is a need to measure changes in a surface of an object in a precise manner. The changes in the surface can be the result of translational movements of the object (e.g., because the object, e.g., a part of a bridge, has moved), or because of internal changes in the object (e.g., of compressive forces, thermal stresses, etc.). There are many solutions involving sensors that are attached to the object, e.g., strain gauges. However, in such situations, electrical isolation of the sensors may be difficult due to grounding issues. In addition, a sensor that is attached to the object may be damaged due to environmental conditions.

There are no-contact sensors, such as capacitive or inductive sensors, that can be utilized which do not actually contact the object. However, these types of sensors require the distance between the sensor and the objects to be extremely small, resulting in less than ideal deployment where such small distances are prohibitive. In addition, electromagnetically shielding such sensors may prove to be difficult or impossible given the particular situation.

Where no-contact sensors are needed and capacitive and inductive sensors are not suitable, optical sensors have been deployed. Such optical sensors operate on the basis of interferometer principals and are able to measure changes in the surface and not the absolute surface of an object. Where such measurements (i.e., absolute measurement and not just relative measurements) are needed, the prior art optical sensors fall short.

Therefore, there is an unmet need for a novel approach to precisely measure surface contours and further to be able to precisely measure changes in such surface contours.

SUMMARY

An ultra-sensitive speckle-analyzing system is disclosed. The system includes an image capture device configured to receive a scattered field having a speckle configuration and thereby capture i) a reference speckle image, and ii) a subsequent speckle image, each of the reference and the subsequent speckle images having a plurality of speckles on a background. The system further includes a processor configured to generate a cross-correlation between the plurality of speckles of the reference and the subsequent speckle images, to thereby represent a change in the speckle configuration.

DETAILED DESCRIPTION

Figure 1:
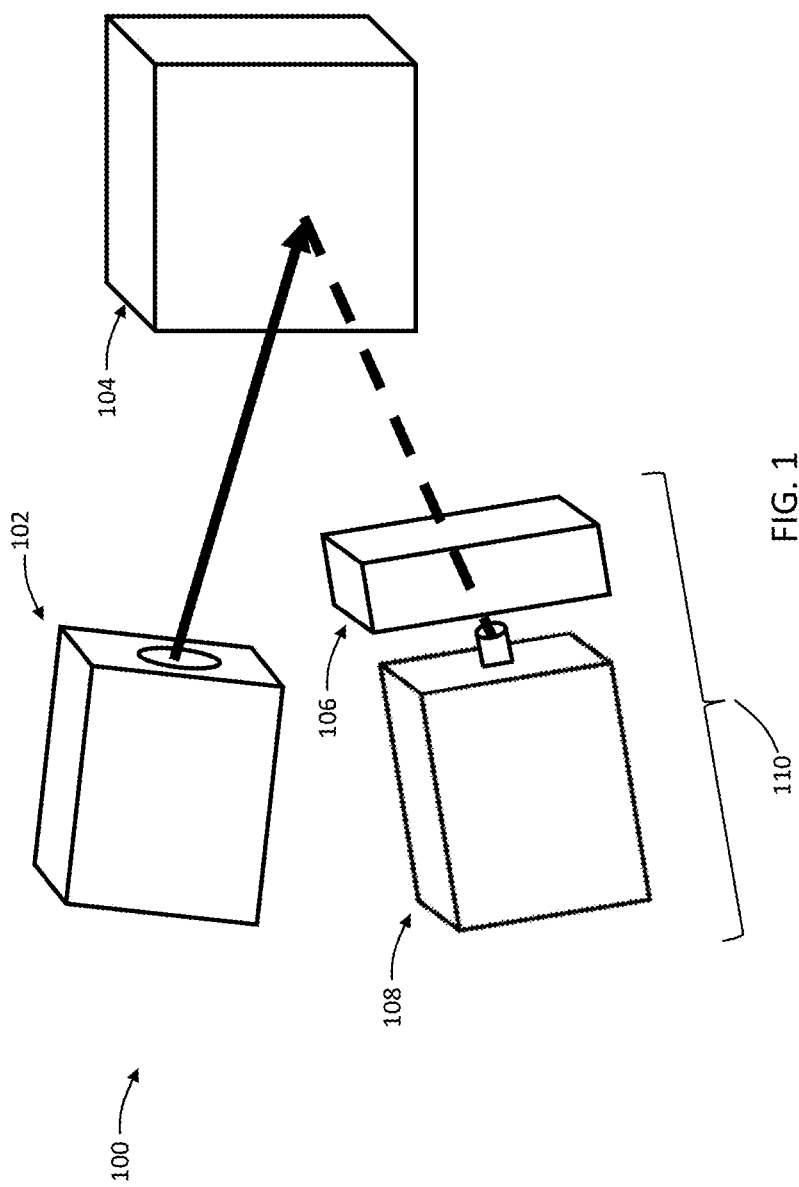
FIG. 1 is a schematic of an ultra-sensitive speckle-analyzing system, according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is described in the present disclosure for precisely measuring changes in surface contours. Towards this end, the present disclosure provides a coherent sensing approach in which a strongly scattering layer, called a scattering analyzer or an analyzer for short, placed in front of a camera, is utilized which altogether constitute an ultra-sensitive detector. This ultra-sensitive detector is based on analyzing speckle patterns. An actual reduction to practice evidences a cross-correlation of normalized speckle patterns detected through the scattering analyzer which is sensitive to subwavelength in-plane displacement of a remote object. The scattering analyzer greatly enhances sensitivity of a decorrelation of speckle patterns over changes, e.g., when the surface contours change as a result of translational movement and/or as a result of internal changes due to compressive/thermal stresses resulting in deformation.

The physics of disordered media is of profound importance in quantum transport and statistical optics, with broad ramifications that include the modeling of small-scale electronic devices and imaging through scattering media. Fundamentally, despite the information that in principle exists in heavily scattered coherent waves, extraction or control remains challenging. In the present disclosure, a concept of super-resolution spatial sensitivity to the field incident on a randomly scattering analyzer slab is disclosed where the scattering medium acts as an analyzer. Experiments indicate far-subwavelength motion sensitivity, and these results are investigated using numerical simulations in conjunction with a theory presented. Breaking the diffraction limit on spatial resolution by a substantial margin, without resorting to fluorescence and use of the point spread function of a microscope, opens new scientific and application domains. A randomly scattering analyzer provides access to far-subwavelength sensitivity to motion of a coherent incident field.

The present disclosure draws upon the fundamental description of electronic transport in disordered wires and involves a new theory to explain the control of electromagnetic waves in scattering media, where understanding how to control the eigenchannels in random transmission matrices is an important step to the control of coherent optical waves in random media. With control of the input channels, such as with a spatial light modulator, it becomes possible to focus laser light through substantial amounts of scatter, such as biological tissue. A novel dimension on randomly scattering material acting as an analyzer for spatial changes in the incident field is thus introduced in the present disclosure.

The system and method of the present disclosure is schematically and conceptually depicted in the schematic of FIG. 1, which shows an ultra-sensitive speckle-analyzing system (or simply system) 100. The system 100 includes a light source 102, e.g., a coherent laser, a remote object of interest 104, and a scattering analyzer 106 and an image capture device 108 (referred to herein as simply camera, however, as discussed below other image capture devices such as photoelectric devices are within the ambit of the image capture device 108) which together form a detector 110, where the scattering analyzer 106 is disposed adjacent the camera 108 and between the camera 108 and the object of interest 104. The ultra-sensitive speckle-analyzing system 100 shown in FIG. 1 is adapted to remotely detect vibration, expansion, deformation or motion of an object of interest. The camera 108 is an intensity camera and the scattering analyzer 106 is a slab of scattering material, such as white plastic.

Figure 2:
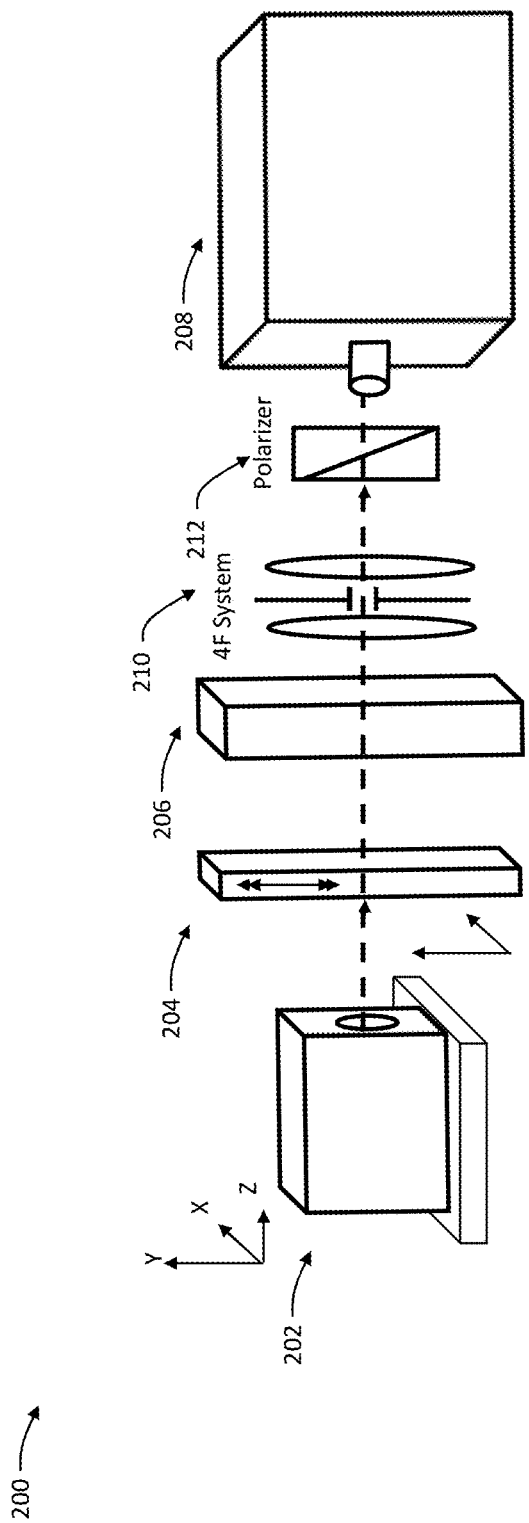
FIG. 2 is a schematic of an experimental scattering analyzer setup to test the system of FIG. 1.

The light shone on the object 104 is depicted as reflected light from the object 104, however, it should be appreciated that the light can be transmitted through the object 104 (as shown in FIG. 2, below). The main point is that what approaches the image capture device 108 is in a speckle configuration thereby allowing the image capture device to capture the speckle image. This speckle image can be generated via: 1) an object that can generate the speckle configuration, 2) a scattering analyzer adjacent to the image capture device that can generate the speckle configuration, 3) a scattering material between the object and the light source that can generate the speckle configuration, 4) a scattering material between the object and the image capture device that can generate the speckle configuration, or 5) a combination thereof. In each of these instances (embodiments), the image capture device is configured to receive the speckle configuration and capture the speckle configuration as a speckle image which represents a plurality of speckles disposed on a solid background (e.g., a plurality of white speckles on a black background). An initial speckle image is then used as a reference image. When the object has moved or deformed and a new speckle image is obtained, a cross-correlation is obtained between the new image and the reference image of the positions of speckles. This cross-correlation can be used to provide a measure of movement of the object and/or deformation of the object.

To realize the concept depicted in FIG. 1, an experimental scattering analyzer setup 200 was developed and which is shown in FIG. 2. The setup 200 shown in FIG. 2 includes a laser diode 202 which is movable along a Cartesian coordinate system (XYZ), a diffusing object of interest 204 which is also moveable along XY and which was translated in the transverse plane, along the y axis (i.e., moved along the y-axis), as shown in FIG. 2. The setup 200 also includes a scattering analyzer 206 and a camera 208 which are both kept in place.

A 59-mW, 850-nm laser diode with a linewidth less than 10 MHz was used for illumination, producing a laser beam that is about 0.4 mm in diameter on the moving diffusing object 204. Referring to FIG. 2, the moving object 204 used is a 3-mm-thick acrylic slab, with a stage utilized to move the slab in the y direction at sub-wavelength step of 476 nm. The scattering analyzer 206 used is a single ground glass of 1500 grit (10 cm×10 cm×0.2 cm), a 3-mm-thick acrylic slab and a 6-mm-thick acrylic slab. The scattering slabs (14 cm×14 cm) 204, were made of commercial clear acrylic with negligible optical absorption and embedded with $TiO_2$ scatterers having a mean diameter of 50 nm. The reduced scattering coefficient of the scattering acrylic slabs is about 4 $cm^{-1}$. The moving slab 204 and the scattering analyzer 206 are separated by a distance of about 5 cm. As part of the scattering analyzer an area of approximately 1.8 mm by 1.8 mm on the back of the second scattering layer, the analyzer, was imaged by a Photometrics Prime sCMOS (2048×2048 pixels) using magnifying optics. A 4F system 210 is used to adjust the speckle size in relation to the camera pixel size and a polarizer 212 is used so that light that is polarized in one direction is detected. The 4F system 210 includes an aperture in the Fourier plane utilized to regulate the size of the speckle intensity pattern at the camera, so that there are an adequate number of pixels within the correlation area and a sufficient number of correlation domains for averaging (possible because the statistics are stationary). Measurement through the linear (co-polarized) polarizer 212 provides for zero-mean circular Gaussian and the measured negative exponential intensity statistics. In one set of experiments conducted, only the scattering analyzer is changed while the remainder of the experimental configuration is kept the same and in place, thus allowing study of how an increasing amount of scatter in the analyzer results in a more rapid decorrelation, and hence greater sensitivity to the changing incident field associated with the translated diffusing slab (a 3-mm-thick acrylic slab).

Figure 3:
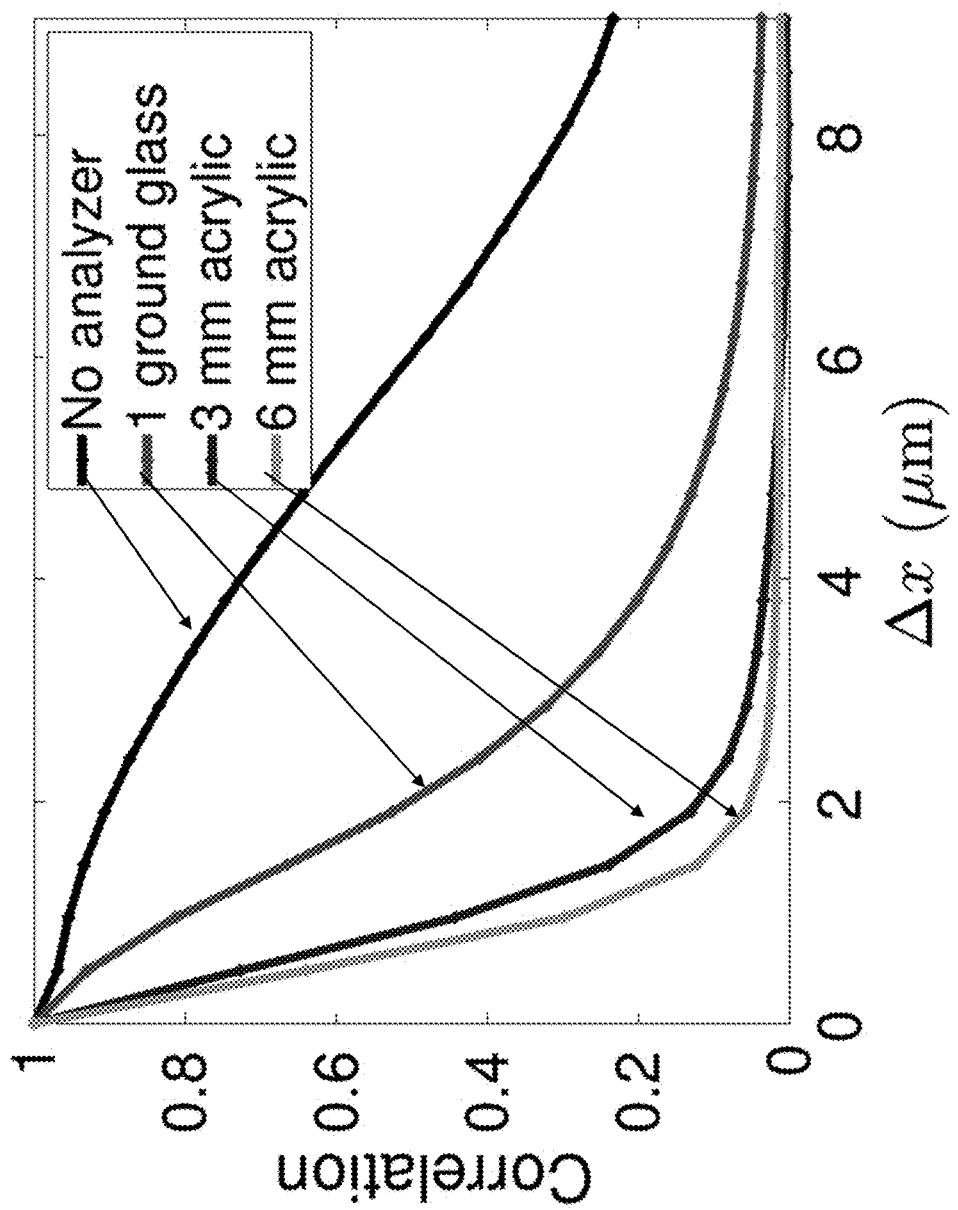
FIG. 3 is a graph of correlation vs. $\Delta y$ in $\mu m$ for different thicknesses of the scattering analyzer shown in FIG. 2.

Data from these various scattering analyzers were obtained using the setup shown in FIG. 2, and presented in FIG. 3, which is a plot of correlation vs. $\Delta y$ (μm). Referring to FIG. 3, the correlation over the translation of the object decreases at different rates for different analyzers. The more scattering the analyzer 206 is, the faster the decorrelation occurs. With a thicker analyzer 206, one is able to sense sub-wavelength translation of a remote object. In FIG. 3, four graphs are presented for the case of i) no scattering analyzer (i.e., the scattering analyzer 206 is removed), ii) a ground glass (i.e., the scattering analyzer 206 is simply a ground glass), iii) a 3-mm-thick acrylic slab (i.e., the scattering analyzer 206 is simply a 3-mm acrylic slab with $TiO_2$ scatterers), and iv) a 6-mm-thick acrylic slab (i.e., the scatscattering analyzer 206 is simply a 6-mm acrylic slab TiO$_2$ scatterers). Inspecting FIG. 3, it can be seen that as the scattering strength of the scattering analyzer 206 increases, the intensity correlation decorrelates faster. In other words, the thicker analyzer 206 is able to detect subwavelength displacement ($\Delta y$) with greater sensitivity, at the expense of having smaller signal level. Thus, by using a thicker analyzer 206, the decorrelation is drastically faster, even for sub-pixel and subwavelength displacement.

Figure 4A:
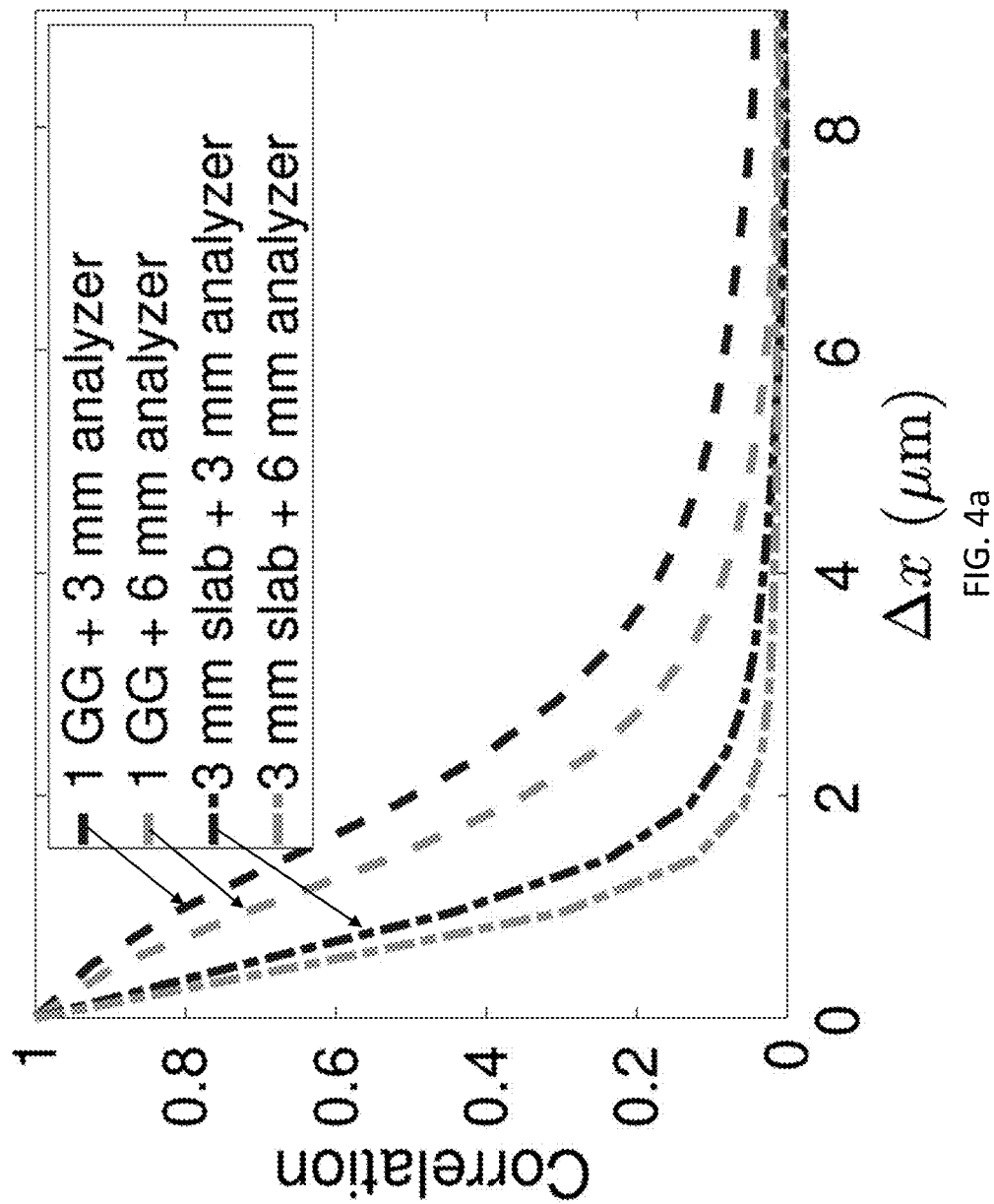
FIG. 4a is a graph of correlation vs. $\Delta x$ in $\mu m$ showing influence of variations in the scattering strength of a moving diffuser.
Figure 4B:
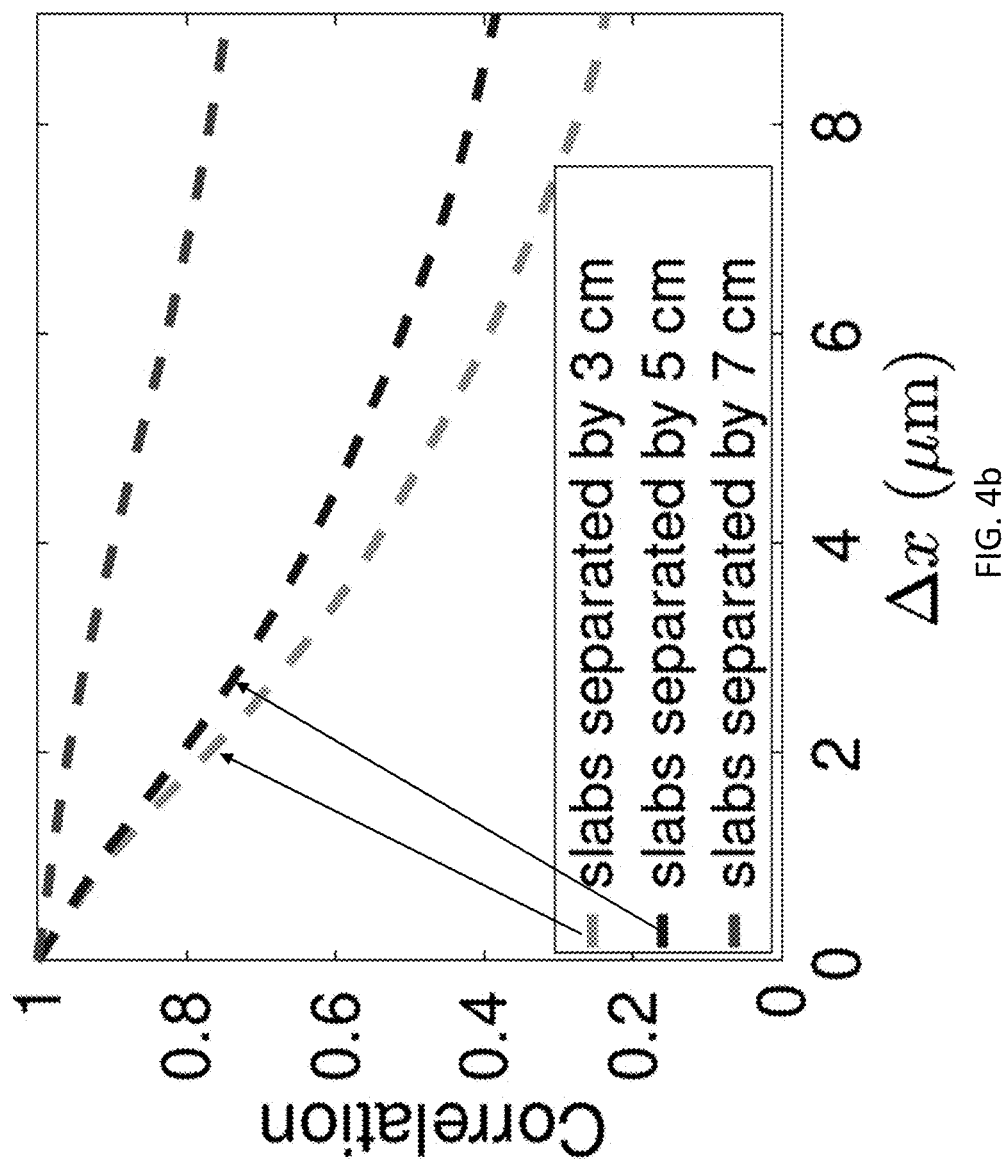
FIG. 4b is a graph of correlation vs. $\Delta x$ in $\mu m$ showing the influence of variations in the separation distance between the analyzer and the moving object.

Experimental speckle correlation data with additional variables are shown in FIGS. 4a and 4b using the arrangement of FIG. 2. The influence of variations in the scattering strength of a moving diffuser is shown in FIG. 4a which is a graph of correlation vs. $\Delta x$ in μm; and the influence of variations in the separation distance between the analyzer and the moving object is shown in FIG. 4b which is also a graph of correlation vs. $\Delta x$ in μm. Referring to FIG. 4a, it can be observed that the more-scattering 3-mm-thick acrylic slab produces faster decorrelation when compared to 1 moving ground glass (1 GG) as the larger spread of speckle intensity exiting the acrylic slab results in smaller speckle spots incident on the analyzer, producing faster decorrelation. Referring to FIG. 4b, it can be observed that the rate of speckle decorrelation increases for smaller separation between the diffusing moving object (1 ground-glass slab) and the analyzer (3-mm-thick acrylic slab). Both phenomena can be understood as diffractive effects, based on light passing through the moving scattering slab. With more scatter at the moving slab, the effective spatial support of the light entering the analyzer increases, and this results in a more rapid decorrelation. Increasing the distance between the moving slab and the analyzer increases the average speckle size and results in a less rapid intensity correlation. Thus, more scatter in the moving diffuser or smaller distance to the analyzer both result in smaller speckle size and hence more rapid decorrelation.

The presented random analyzer concept offers opportunities for sensing and microscopy where far-subwavelength spatial information is important. We showed that the averaged speckle intensity correlation over subject movement decorrelates faster in the presence of the scattering analyzer, and that the more strongly scattering the analyzer, the faster the decorrelation. This character can be understood based on the singular value distribution of the analyzer. This remote sensing approach with a randomly scattering analyzer is applicable to all wave types, and hence offers substantial scope for impact on the physical sciences. While we have treated the informational aspects of the analyzer, achieving identification is possible with calibration. Under a constraint set, it may also be possible to image at this sub-wavelength length scale, as proposed using the concept of motion in structured illumination but now with relative motion of a field (perhaps scattered from an object) on the other side of a random analyzer with the specific purpose of enhancing spatial information.

The above-discussed ultra-sensitive speckle-analyzing system provides a randomly scattering analyzer adapted to access enhanced spatial sensing information associated with motion of a coherent incident field. This super-resolution method is able to detect far-subwavelength motion in the far-field of the source of the incident field. Experimental data for the cross-correlation between normalized laser speckle patterns, collected through an analyzer, exhibits sensitivity to subwavelength in-plane displacement of a remote diffuse object, with a more heavily scattering analyzer providing enhanced detection.

A processing system further described with reference to FIG. 5, below, is used to determine and analyze the results from the camera 208.

Figure 5:
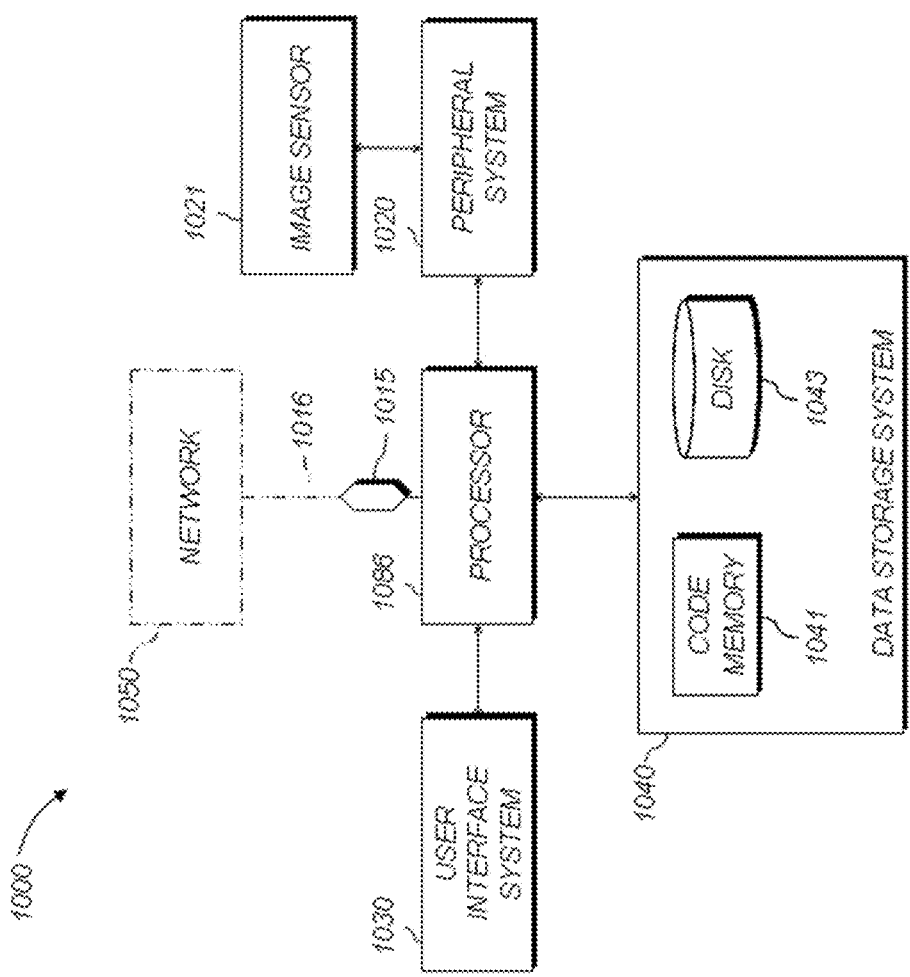
FIG. 5 is an example schematic of a computer system that can interface with the ultra-sensitive speckle-analyzing system of FIG. 1.

Referring to FIG. 5, an example of a computer system is provided that can interface with the above-discussed ultrasensitive speckle-analyzing system. Referring to FIG. 5, a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

While in the present disclosure optical waves have been prominently discussed, no such limitation is intended. To this end, any type of electromagnetic wave can be used, and indeed other wave types. A proper matching of a particular type of electromagnetic wave and a randomly scattering material can be employed for such analyzer-based detection. In addition, while a camera has been shown as an image capture device, it should be appreciated that a host of other image capture devices known to a person having ordinary skill in the art can also be used. Most importantly, the detected field changes can be attributed to any minute change in the system, thereby encompassing signals of various forms, and thus not be limited to a remote object's movement, as presented.

Those having ordinary skill in the art will recognize that numerous modifications can be made to the specific implementations described above. The implementations should not be limited to the particular limitations described. Other implementations may be possible.

The invention claimed is:

1. An ultra-sensitive speckle-analyzing system, comprising:
   a camera configured to receive a scattered field having a speckle configuration and thereby i) capture a reference speckle image, and ii) a subsequent speckle image, each of the reference and the subsequent speckle images having a plurality of speckles on a background;
   a light source configured to be incident on a light diffusing object; and
   a scattering analyzer positioned between the light diffusing object and the camera, wherein the speckle configuration is further enhanced for determining the cross-correlation with the aid of the scattering analyzer; and
   a processor configured to generate a cross-correlation between the plurality of speckles of the reference and the subsequent speckle images, to thereby represent a change in the speckle configuration.

2. The ultra-sensitive speckle-analyzing system of claim 1, wherein the change in the speckle configuration is based on changes in the light diffusing object.

3. The ultra-sensitive speckle-analyzing system of claim 2, wherein the changes in the light-diffusing object include translation of the object.

4. The ultra-sensitive speckle-analyzing system of claim 2, wherein the changes in the light-diffusing object include dimensional changes in the object.

5. The ultra-sensitive speckle-analyzing system of claim 2 where both far-subwavelength and macroscopic information about the translated object can be obtained.

6. The ultra-sensitive speckle-analyzing system of claim 1, wherein the scattering analyzer is made of glass.

7. The ultra-sensitive speckle-analyzing system of claim 1, wherein the scattering analyzer is made of acrylic.

8. The ultra-sensitive speckle-analyzing system of claim 6, wherein the acrylic is about 3 mm thick.

9. The ultra-sensitive speckle-analyzing system of claim 6, wherein the acrylic is about 6 mm thick.

10. The ultra-sensitive speckle-analyzing system of claim 6, wherein the acrylic is between about 3 mm and about 6 mm.

11. The ultra-sensitive speckle-analyzing system of claim 6, wherein the acrylic is embedded with a plurality of $TiO_2$ scatterer particles.

12. The ultra-sensitive speckle-analyzing system of claim 11, wherein the $TiO_2$ particles have a mean diameter of about 50 nm.

13. The ultra-sensitive speckle-analyzing system of claim 6, wherein the glass is embedded with a plurality of $TiO_2$ scatterer particles.

14. The ultra-sensitive speckle-analyzing system of claim 12, wherein the $TiO_2$ particles have a mean diameter of about 50 nm.

15. The ultra-sensitive speckle-analyzing system of claim 1, wherein the light source is a coherent laser.

16. The ultra-sensitive speckle-analyzing system of claim 14, wherein the laser is an 850 nm laser.

17. The ultra-sensitive speckle-analyzing system of claim 1, wherein the light from the light source passes through the light-diffusing object.

18. The ultra-sensitive speckle-analyzing system of claim 1, wherein the light from the light source reflects from the light-diffusing object.

* * * * *